United States Patent
Ishihata et al.

(10) Patent No.: US 9,458,751 B2
(45) Date of Patent: Oct. 4, 2016

(54) EXHAUST HEAT RECOVERY CONTROL DEVICE

(71) Applicant: TOYOTA JIDOSHA KABUSHIKI KAISHA, Toyota-shi (JP)

(72) Inventors: Takato Ishihata, Takahama (JP); Yuichiro Hirata, Miyoshi (JP); Toshio Murata, Toyota (JP); Nakaya Takagaki, Toyota (JP); Hideyuki Komitsu, Toyota (JP); Yojiro Iriyama, Toyota (JP); Kazutoshi Wakatsuki, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/606,408

(22) Filed: Jan. 27, 2015

(65) Prior Publication Data

US 2015/0218998 A1 Aug. 6, 2015

(30) Foreign Application Priority Data

Feb. 4, 2014 (JP) ................................. 2014-019510

(51) Int. Cl.
*F01N 5/02* (2006.01)
*F01N 9/00* (2006.01)
(Continued)

(52) U.S. Cl.
CPC . *F01N 5/02* (2013.01); *F01N 9/00* (2013.01); *F01P 7/14* (2013.01); *F02G 5/02* (2013.01); *F01N 3/005* (2013.01); *F01N 3/0205* (2013.01); *F01N 3/043* (2013.01); *F01N 2240/02* (2013.01); *F01N 2240/36* (2013.01); *F01N 2260/024* (2013.01); *F01N 2260/08* (2013.01); *F01N 2900/0422* (2013.01); *F01N 2900/08* (2013.01); *F01N 2900/102* (2013.01); *F01P 2025/13* (2013.01); *F01P 2025/30* (2013.01); *F01P2060/08* (2013.01); *F01P 2060/16* (2013.01); *F28D 21/0003* (2013.01); *Y02T 10/16* (2013.01); *Y02T 10/166* (2013.01); *Y02T 10/47* (2013.01)

(58) Field of Classification Search
CPC ...... F01N 3/005; F01N 3/0205; F01N 3/043; F01N 5/02; F01N 2240/02; F01N 2260/024; F01N 2260/08; F01N 2900/0422; F01N 2900/08; F01N 2900/102; F02G 5/02; F28D 21/0003; Y02T 10/166
USPC ........................... 60/277, 287, 298, 320, 324
See application file for complete search history.

(56) References Cited

U.S. PATENT DOCUMENTS

| | | | |
|---|---|---|---|
| 2009/0032213 A1* | 2/2009 | Mukoubara | B60H 1/20 165/41 |
| 2011/0041505 A1* | 2/2011 | Kasuya | F01K 23/065 60/660 |

(Continued)

FOREIGN PATENT DOCUMENTS

| | | |
|---|---|---|
| JP | 2001-32716 A | 2/2001 |
| JP | 2006-161593 A | 6/2006 |

(Continued)

*Primary Examiner* — Jorge Leon, Jr.
(74) *Attorney, Agent, or Firm* — Oblon, McClelland, Maier & Neustadt, L.L.P.

(57) ABSTRACT

An exhaust heat recovery control device includes a recovered heat adjusting unit configured to adjust an amount of heat recovered of exhaust gas by an exhaust heat recoverer recovering heat of exhaust gas and a control unit configured to control the recovered heat adjusting unit so as to prevent or suppress freezing in an exhaust pipe based on a traveling history of a vehicle on which the exhaust heat recovery control device is mounted when the freezing in the exhaust pipe is predicted.

6 Claims, 4 Drawing Sheets

(51) Int. Cl.
*F01P 7/14* (2006.01)
*F02G 5/02* (2006.01)
*F01N 3/02* (2006.01)
*F28D 21/00* (2006.01)
*F01N 3/00* (2006.01)
*F01N 3/04* (2006.01)

(56) References Cited

U.S. PATENT DOCUMENTS

| | | | | |
|---|---|---|---|---|
| 2011/0099989 A1* | 5/2011 | Prior | ............ | F01N 3/043 |
| | | | | 60/320 |
| 2011/0126783 A1* | 6/2011 | Hwang | ............ | F01N 5/02 |
| | | | | 123/41.1 |
| 2014/0165562 A1* | 6/2014 | Nagai | ............ | F01P 7/165 |
| | | | | 60/615 |

FOREIGN PATENT DOCUMENTS

| | | |
|---|---|---|
| JP | 2006-220076 A | 8/2006 |
| JP | 2006-233770 A | 9/2006 |
| JP | 2006-283579 A | 10/2006 |
| JP | 2006-283711 A | 10/2006 |
| JP | 2006-312884 A | 11/2006 |
| JP | 2010-180757 A | 8/2010 |
| JP | 2011-111963 A | 6/2011 |
| WO | WO 2013046929 A1 * 4/2013 | ............ F01P 7/165 |

* cited by examiner

F I G . 1
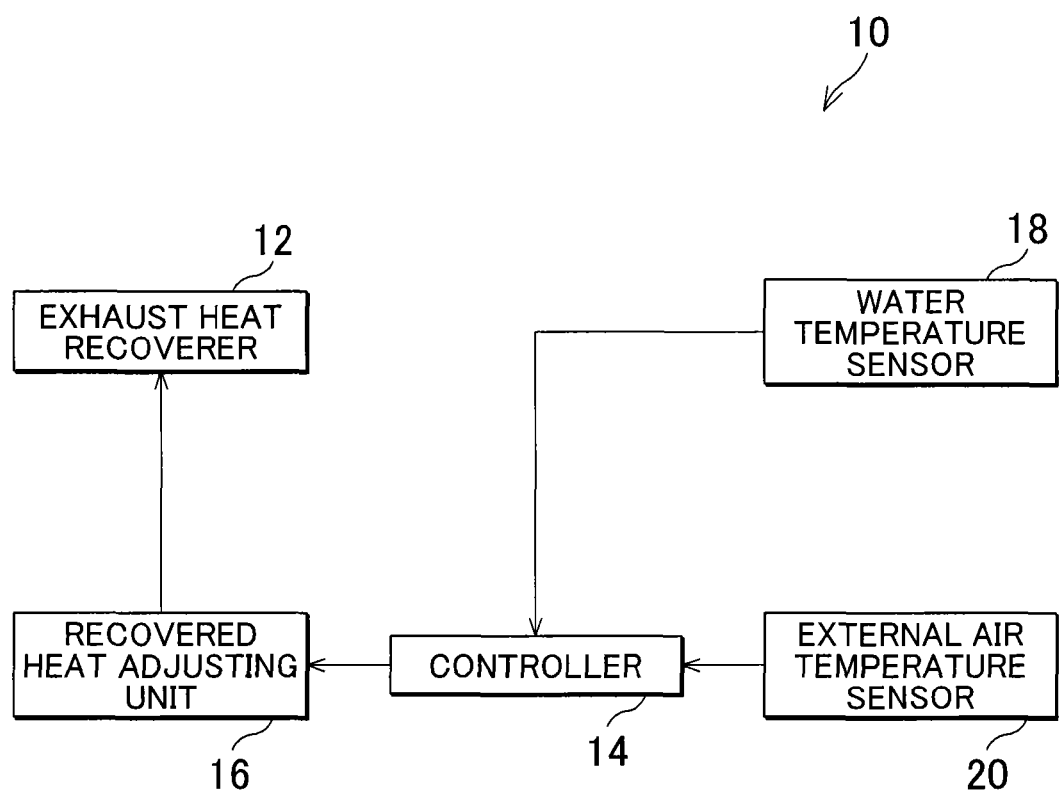

EXHAUST HEAT RECOVERY CONTROL DEVICE

INCORPORATION BY REFERENCE

The disclosure of Japanese Patent Application No. 2014-019510 filed on Feb. 4, 2014 including the specification, drawings and abstract is incorporated herein by reference in its entirety.

BACKGROUND OF THE INVENTION

1. Field of the Invention

The present invention relates to an exhaust heat recovery control device that controls an exhaust heat recoverer recovering exhaust heat of an exhaust pipe or the like.

2. Description of Related Art

In an exhaust heat recoverer recovering exhaust heat from an exhaust pipe or the like, condensed water may be produced by recovering exhaust heat and thus cooling exhaust gas. The condensed water may cause damage to a catalyst unit for purifying exhaust gas, a switching valve for switching a flow channel of exhaust gas to an exhaust heat recoverer, and the like.

Therefore, Japanese Patent Application Publication No. 2006-161593 (JP 2006-161593 A) proposes an exhaust heat recovery system that prevents condensed water from coming into contact with a catalyst unit, a switching valve, or the like.

Specifically, in the exhaust heat recovery system described in JP 2006-161593 A, a heat exchanger for exhaust heat recovery is arranged in parallel with an exhaust pipe between a branched pipe branched from the exhaust pipe and a merged pipe merging on the downstream side of the branched part of the exhaust pipe. A flow channel switching valve switching a flow channel of exhaust gas to the exhaust pipe or the heat exchanger for exhaust heat recovery is disposed between the branched part and the merged part of the exhaust pipe. A part including a region between the flow channel switching valve and the merged part in the exhaust pipe is provided with a liquid storage part in which liquid can be stored.

However, in an environment below the freezing point, there is a possibility that condensed water produced in the exhaust heat recoverer will be frozen in the exhaust pipe. When the freezing in the exhaust pipe is not released but is kept in some traveling conditions and condensed water is further produced and frozen, the decrease in output power of an engine or the degradation in interior noise due to exhaust sound (also referred to as degradation in noise and vibration (NV) performance) may be caused, which provides room for improvement.

SUMMARY OF THE INVENTION

The invention causes recovery of exhaust heat and suppression of performance degradation due to the freezing of condensed water to be compatible with each other.

According to an aspect of the invention, there is provided an exhaust heat recovery control device including: a recovered heat adjusting unit configured to adjust an amount of heat recovered of exhaust gas by an exhaust heat recoverer recovering heat of exhaust gas; and a control unit configured to control the recovered heat adjusting unit so as to prevent or suppress freezing in an exhaust pipe based on a traveling history of a vehicle on which the exhaust heat recovery control device is mounted when the freezing in the exhaust pipe is predicted.

According to this configuration, the recovered heat adjusting unit adjusts the amount of heat recovered of exhaust gas by the exhaust heat recoverer recovering heat of the exhaust gas.

The control unit controls the recovered heat adjusting unit so as to prevent or suppress freezing in the exhaust pipe based on the traveling history when the freezing in the exhaust pipe is predicted. For example, when it is determined based on the traveling history that the freezing is not released, the freezing in the exhaust pipe can be released by controlling the recovered heat adjusting unit so as to reduce or limit the amount of heat recovered of exhaust gas. On the other hand, when it is determined based on the traveling history that the freezing is released, it is possible to recover exhaust heat by controlling the exhaust heat recoverer so as to recover heat or controlling the recovered heat adjusting unit so as to increase the amount of heat recovered. Accordingly, it is possible to cause the recovery of exhaust heat and the suppression of performance degradation due to the freezing of condensed water.

For example, the control unit may control the recovered heat adjusting unit so as to decrease the amount of heat recovered of exhaust gas by the exhaust heat recoverer when a previous traveling time as the traveling history is equal to or shorter than a predetermined reference time. That is, it can be determined based on the previous traveling time whether the freezing in the exhaust pipe is released. Accordingly, when the previous traveling time is equal to or shorter than a predetermined reference time, there is a high possibility that the inside of the exhaust pipe is frozen and it is thus possible to release the freezing in the exhaust pipe by controlling the recovered heat adjusting unit so as to decrease the amount of heat recovered.

The exhaust heat recoverer may raise the temperature of a coolant for cooling an engine using the recovered heat of exhaust gas, the recovered heat adjusting unit may include a circulation unit configured to circulate the coolant, and the control unit may adjust the amount of heat recovered of exhaust gas by adjusting an amount of coolant circulated by the circulation unit. Alternatively, the recovered heat adjusting unit may adjust the amount of heat recovered by adjusting a flow rate of exhaust gas passing through the exhaust heat recoverer.

As described above, according to the invention, it is possible to cause recovery of exhaust heat and suppression of performance degradation due to freezing of condensed water to be compatible with each other.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a block diagram schematically illustrating a configuration of an exhaust heat recovery control device according to an embodiment of the invention;

DETAILED DESCRIPTION OF EMBODIMENTS

Figure 2A:
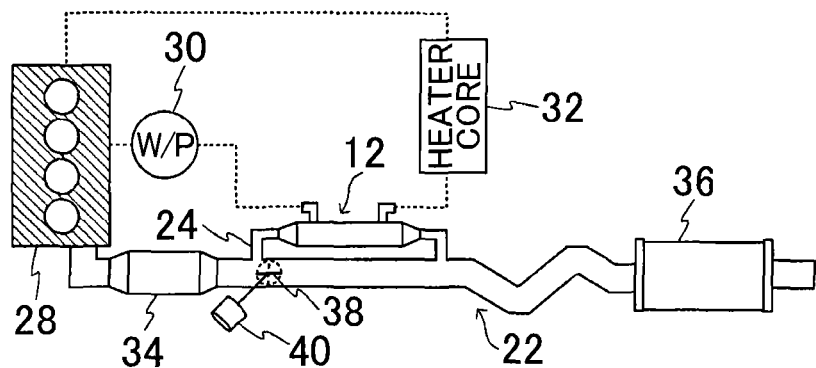
FIGS. 2A to 2C are diagrams illustrating arrangement examples of an exhaust heat recoverer and specific examples of a recovered heat adjusting unit.

Hereinafter, an example of an embodiment of the invention will be described in detail with reference to the accompanying drawings. FIG. 1 is a block diagram schematically illustrating a configuration of an exhaust heat recovery control device according to an embodiment of the invention.

In an exhaust heat recovery control device 10, a recovered heat adjusting unit for adjusting an amount of heat recovered by an exhaust heat recoverer 12 recovering heat of exhaust gas is connected to a controller 14 as the control unit.

The exhaust heat recoverer 12 is disposed in an exhaust pipe through which exhaust gas of an automobile passes, recovers heat of the exhaust gas of the engine of the automobile, and uses the recovered heat for promotion of space heating or warming-up of an engine or the like.

The controller 14 controls the recovered heat adjusting unit so as to control whether to recover the heat of exhaust gas or an amount of heat recovered through the use of the exhaust heat recoverer 12.

The controller 14 is connected to a water temperature sensor 18 and an external air temperature sensor 20. That is, the detection results of the water temperature sensor 18 and the external air temperature sensor 20 are input to the controller 14. This embodiment describes an example in which the detection results of the water temperature sensor 18 and the external air temperature sensor 20 are directly input to the controller 14, but the invention is not limited to this example. For example, the detection result of the water temperature sensor 18 may be input to the controller 14 via an engine electronic control unit (ECU) and the detection result of the external air temperature sensor 20 may be input to the controller 14 via an air-conditioner ECU.

The controller 14 controls the recovered heat adjusting unit on the basis of the detection results of the water temperature sensor 18 and the external air temperature sensor 20.

Figure 2B:
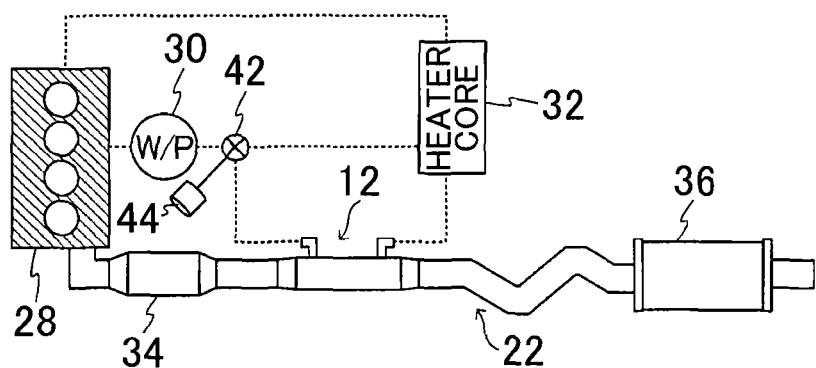
Figure 2C:
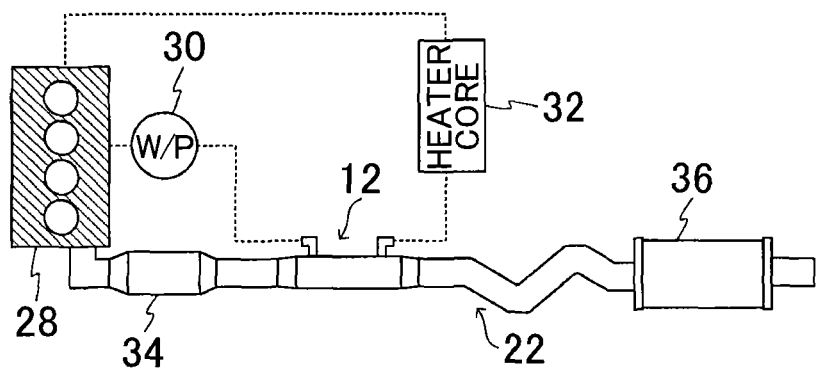

Now, arrangement examples of the exhaust heat recoverer 12 and specific examples of the recovered heat adjusting unit will be described below. FIGS. 2A to 2C are diagrams illustrating arrangement examples of the exhaust heat recoverer 12 and specific examples of the recovered heat adjusting unit.

In the example illustrated in FIG. 2A, a catalyst unit 34 and a main muffler 36 are disposed sequentially from the upstream side in the discharge path of an exhaust pipe 22 for discharging exhaust gas from the engine 28. A bypass path 24 is disposed in parallel with the exhaust pipe 22 between the main muffler 36 and the catalyst unit 34, and the exhaust heat recoverer 12 is disposed in the bypass path 24.

A coolant for cooling the engine 28 is circulated to the exhaust heat recoverer 12 by a water pump (W/P) 30. The coolant circulated to the exhaust heat recoverer 12 flows into a heater core 32 and is returned to the engine 28. That is, the flow channel of the coolant is provided with the exhaust heat recoverer 12 so as to recover the heat of exhaust gas through the use of the exhaust heat recoverer 12 and to raise the temperature of the coolant, which can be used for a heat source of a heater, promotion of warming-up, or the like.

The exhaust pipe 22 is provided with a switching valve 38 so as to adjust an amount of exhaust gas flowing into the bypass path 24 or to switch the flow channel through the use of the switching valve 38. The switching valve 38 is operated by an actuator 40. That is, by causing the controller 14 to control the operation of the actuator 40, the amount of exhaust gas flowing into the exhaust heat recoverer 12 is adjusted and the amount of exhaust heat recovered is adjusted. Accordingly, the actuator 40 driving the switching valve 38 and the water pump 30 serve as the recovered heat adjusting unit. The opening and shutting of the switching valve 38 may be controlled so as to control whether to cause exhaust gas to flow into the exhaust heat recoverer 12, or the degree of opening of the switching valve 38 may be controlled so as to control the flow rate of exhaust gas flowing into the exhaust heat recoverer 12.

In the example illustrated in FIG. 2B, a catalyst unit 34, an exhaust heat recoverer 12, and a main muffler 36 are disposed sequentially from the upstream side in the discharge path of the exhaust pipe 22 for discharging exhaust gas from the engine 28.

Similarly to FIG. 2A, a coolant for cooling the engine 28 is circulated to the exhaust heat recoverer 12 by a water pump (W/P) 30. The coolant circulated to the exhaust heat recoverer 12 flows into a heater core 32 and is returned to the engine 28. That is, the flow channel of the coolant is provided with the exhaust heat recoverer 12 so as to recover the heat of exhaust gas through the use of the exhaust heat recoverer 12 and to raise the temperature of the coolant, which can be used for a heat source of a heater, promotion of warming-up, or the like.

The circulation path of the coolant is provided with a bypass path supplying the coolant to the heater core 32 without passing through the exhaust heat recoverer 12. That is, the circulation path of the coolant includes a circulation path passing through the exhaust heat recoverer 12 and a circulation path not passing through the exhaust heat recoverer 12.

A switching valve 42 for switching the circulation path between the two circulation paths is disposed so as to switch the circulation path of the coolant through the use of the switching valve. The switching valve 42 is operated by an actuator 44. That is, by causing the controller 14 to control the operation of the actuator 44, the amount of coolant circulating to the exhaust heat recoverer 12 is adjusted and the amount of exhaust heat recovered is adjusted. Accordingly, the actuator 44 driving the switching valve 42 and the water pump 30 serve as the recovered heat adjusting unit. The opening and shutting of the switching valve 42 may be controlled so as to control whether to cause coolant to flow into the exhaust heat recoverer 12, or the degree of opening of the switching valve 42 may be controlled so as to control the flow rate of coolant flowing into the exhaust heat recoverer 12.

In the example illustrated in FIG. 2C, similarly to FIG. 2B, a catalyst unit 34, an exhaust heat recoverer 12, and a main muffler 36 are disposed sequentially from the upstream side in the discharge path of the exhaust pipe 22 for discharging exhaust gas from the engine 28.

Similarly to FIG. 2A, a coolant for cooling the engine 28 is circulated to the exhaust heat recoverer 12 by a water pump (W/P) 30. The coolant circulated to the exhaust heat recoverer 12 flows into a heater core 32 and is returned to the engine 28. That is, the flow channel of the coolant is provided with the exhaust heat recoverer 12 so as to recover the heat of exhaust gas through the use of the exhaust heat recoverer 12 and to raise the temperature of the coolant, which can be used for a heat source of a heater.

In the example illustrated in FIG. 2C, the water pump 30 that is driven by a motor or the like is applied to change the flow rate of the coolant through the use of the water pump 30. That is, by controlling the controller 14 to control the water pump 30 so as to adjust the flow rate of the coolant flowing into the exhaust heat recoverer 12, the amount of exhaust heat recovered is adjusted. Accordingly, the water pump 30 can be considered as the circulation unit and serves as the recovered heat adjusting unit.

The configurations illustrated in FIGS. 2A to 2C may be combined. Alternatively, the water pump 30 illustrated in FIG. 2C may be applied to the configurations illustrated in FIGS. 2A, 2B and the controller 14 may be configured to control the actuators 40, 44 and the water pump 30. Alternatively, the configurations illustrated in FIGS. 2A, 2B may be combined.

When the engine is stopped and put in the environment below the freezing point in a state in which condensed water is produced and is not discharged but remains in the exhaust pipe, there is a possibility that the condensed water will be frozen in the exhaust pipe 22.

An example of the reason for the remaining of condensed water is that the exhaust pipe 22 has level differences to avoid other components and the condensed water is not discharged to the downstream side when there is not a certain degree of flow rate of gas (a certain engine rotation speed).

When the condensed water is frozen in the exhaust pipe 22, it is considered that the condensed water is not melted and remains depending on the traveling conditions. When the condensed water is frozen and remains and condensed water is further produced and is frozen, there is a possibility that a decrease in output power of the engine due to the degradation in exhaust performance, the degradation in interior noise due to exhaust sound, and the like will be caused.

Accordingly, in this embodiment, the controller 14 controls the recovered heat adjusting unit on the basis of the traveling history so as to adjust the amount of exhaust heat recovered by the exhaust heat recoverer 12.

Figure 3:
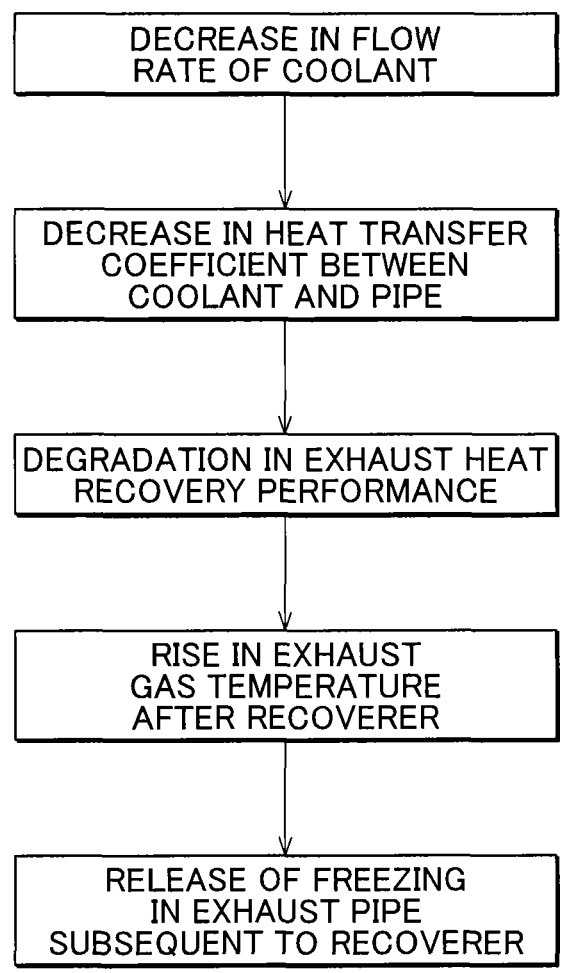
FIG. 3 is a diagram illustrating an operation due to a decrease in a flow rate of a coolant.

For example, in the configuration example illustrated in FIG. 2A, the amount of exhaust heat recovered can be adjusted by adjusting the flow rate of exhaust gas flowing into the exhaust heat recoverer 12. For example, when the flow rate of exhaust gas flowing into the exhaust heat recoverer 12 is decreased, the amount of heat recovered is also decreased. In the configuration examples illustrated in FIGS. 2B, 2C, the amount of exhaust heat recovered can be adjusted by adjusting the flow rate of the coolant flowing into the exhaust heat recoverer 12. That is, as illustrated in FIG. 3, when the flow rate of the coolant is decreased, the heat transfer coefficient between the coolant and the pipe is decreased and the exhaust heat recovery performance degrades. When the exhaust heat recovery performance degrades, the exhaust gas temperature after the exhaust heat recoverer 12 rises and the freezing in the exhaust pipe 22 subsequent to the exhaust heat recoverer 12 can be released. The production of condensed water is decreased and thus the freezing of the produced condensed water and the enlargement of the frozen part are suppressed.

Figure 4:
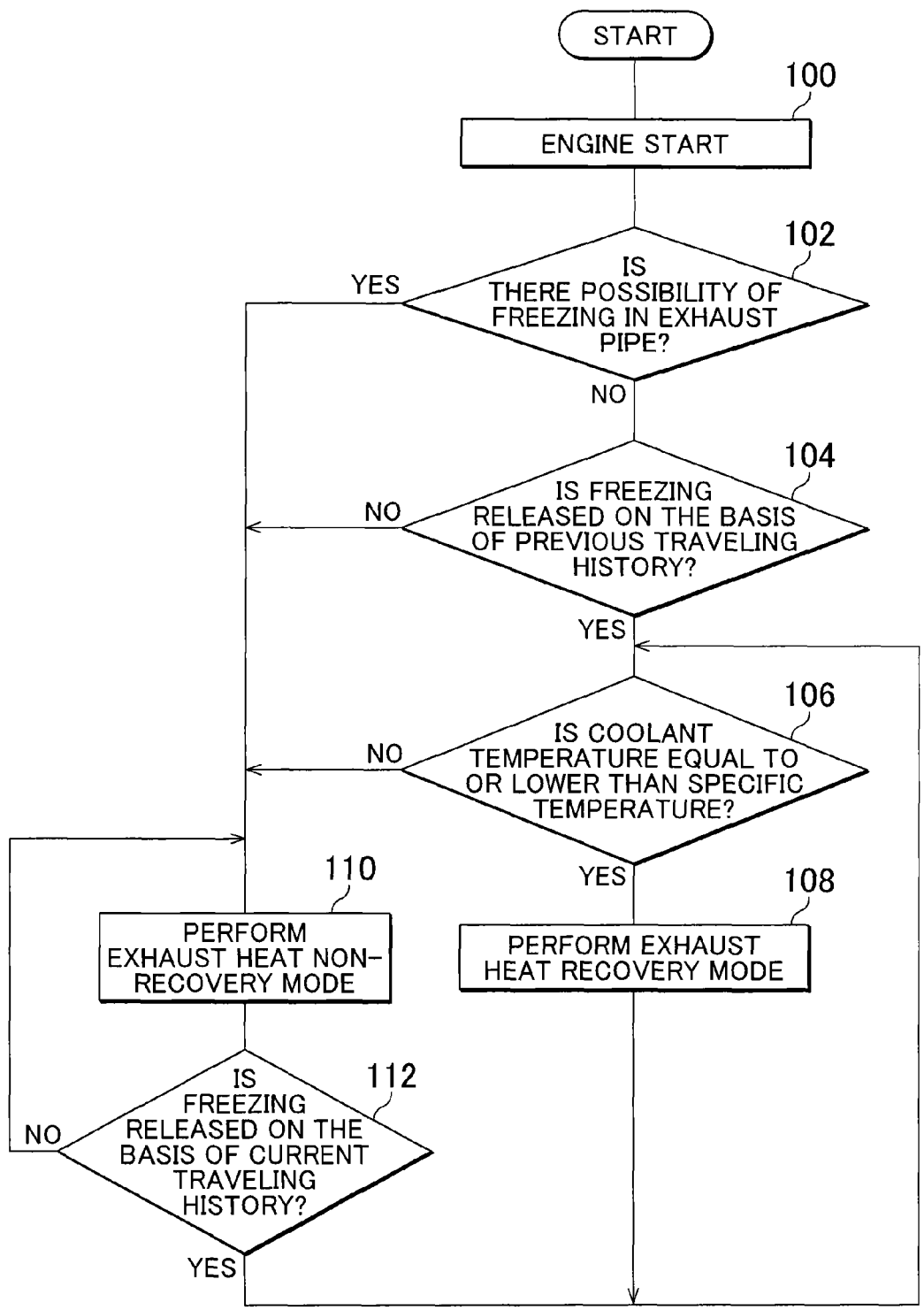
FIG. 4 is a flowchart illustrating an example of a process flow that is performed by a controller of the exhaust heat recovery control device according to the embodiment of the invention.

Specific processes that are performed by the controller 14 of the exhaust heat recovery control device 10 according to this embodiment having the above-mentioned configuration will be described below. FIG. 4 is a flowchart illustrating an example of the process flow that is performed by the controller 14 of the exhaust heat recovery control device 10 according to this embodiment. The process flow illustrated in FIG. 4 is started when an ignition switch (IG) not illustrated is turned on, and is ended when the IG is turned off.

First, in step 100, the controller 14 starts the engine 28 and then the process flow goes to step 102.

In step 102, the controller 14 determines whether there is a possibility that the exhaust pipe 22 will be frozen. Regarding this determination, for example, the controller 14 determines whether the external air temperature is equal to or lower than a predetermined threshold value on the basis of the detection result of the external air temperature sensor 20. The process flow goes to step 104 when the determination result is negative, and goes to step 110 when the determination result is positive. It may be determined on the basis of the history of the external air temperature when there is a possibility that the exhaust pipe 22 will be frozen. For example, when the current external air temperature is not below the freezing point but is temporarily below the freezing point at the time of stopping the engine, it can be determined that there is a possibility of the freezing.

In step 104, the controller 14 determines whether the freezing is released on the basis of the previous traveling history. Regarding this determination, the controller 14 determines whether the freezing in the exhaust pipe 22 is released, for example, by determining whether the previous traveling time is equal to or longer than a predetermined reference time. The process flow goes to step 106 when the determination result is positive, and goes to step 110 when the determination result is negative. As the traveling history, a maximum amount of exhaust gas discharged, an amount of fuel consumed, a maximum rotation speed of the engine, a maximum vehicle speed, a maximum gas temperature of the exhaust gas temperature, a predicted gas temperature or a predicted catalyst temperature predicted by an engine ECU, and the like may be used in addition to the previous traveling time. That is, regarding the determination, it may be determined on the basis of at least one traveling history among the above-mentioned traveling histories whether the freezing in the exhaust pipe 22 is released.

In step 106, the controller 14 determines whether the coolant temperature is equal to or lower than a specific temperature on the basis of the detection result of the water temperature sensor 18. The process flow goes to step 108 when the determination result is positive, and goes to step 110 when the determination result is negative. The specific temperature may be set to different values depending on a space heating request, may be set to A° C. (for example, 60° C.) when the space heating request is given, and may be set to B° C. (for example, 45° C.) when the space heating request is not given.

In step 108, an exhaust heat recovery mode is performed by the controller 14, the process flow is returned to step 106, and the above-mentioned processes are repeatedly performed. In the exhaust heat recovery mode, for example, in the example illustrated in FIG. 2A, the controller 14 controls the driving of the actuator 40 so as to drive the switching valve 38 such that exhaust gas flows into the exhaust heat recoverer 12. In the example illustrated in FIG. 2B, the controller 14 controls the driving of the actuator 44 so as to drive the switching valve 42 such that coolant flows into the exhaust heat recoverer 12. In the example illustrated in FIG. 2C, the controller 14 controls the driving of the water pump 30 so as to increase the flow rate of the coolant flowing in the exhaust heat recoverer 12. By performing these processes, the exhaust heat is recovered by the exhaust heat recoverer 12, the temperature of the coolant is raised, and it is thus possible to assist the space heating or to promote the warming-up of the engine.

On the other hand, in step 110, an exhaust heat non-recovery mode is performed by the controller 14 and then the process flow goes to step 112. In the exhaust heat non-recovery mode, for example, in the example illustrated in FIG. 2A, the controller 14 controls the driving of the actuator 40 so as to drive the switching valve 38 such that the amount of exhaust gas flowing into the exhaust heat recoverer 12 is decreased or limited. In the example illustrated in FIG. 2B, the controller 14 controls the driving of the actuator 44 so as to drive the switching valve 42 such that the amount of coolant flowing into the exhaust heat recoverer 12 is decreased or limited. In the example illustrated in FIG. 2C, the controller 14 controls the driving of the water pump 30 so as to decrease the flow rate of the coolant flowing into the exhaust heat recoverer 12. By performing these processes, the recovery of exhaust heat by the exhaust heat recoverer 12 is stopped or decreased. Accordingly, as described with reference to FIG. 3, the exhaust gas temperature after the exhaust heat recoverer 12 is raised, and the freezing in the exhaust pipe 22 subsequent to the exhaust heat recoverer 12 is released when the condensed water is frozen. The production of condensed water is decreased and thus the freezing of the produced condensed water and the enlargement of the frozen part are suppressed.

In step 112, the controller 14 determines whether the freezing is released on the basis of the current traveling history. The process flow is returned to step 110 and the above-mentioned processes are repeatedly performed when the determination result is negative, and the process flow is returned to step 106 and the above-mentioned processes are repeatedly performed when the determination result is positive. The contents described in step 104 can be used as the traveling history.

The processes that are performed by the controller 14 in the above-mentioned embodiment may be stored as a program in a storage medium and the program may be distributed.

The invention is not limited to the above-mentioned details, and can be modified in various forms without departing from the gist thereof.

What is claimed is:
1. An exhaust heat recovery control device comprising:
   a recovered heat adjusting unit configured to adjust an amount of heat recovered of exhaust gas by an exhaust heat recoverer recovering heat of exhaust gas; and
   a control unit configured to determine whether freezing of a liquid in an exhaust pipe occurs based on a past traveling history of a vehicle and to control the recovered heat adjusting unit, on which the exhaust heat recovery control device is mounted, when the freezing in the exhaust pipe is predicted to occur.
2. The exhaust heat recovery control device according to claim 1, wherein the control unit controls the recovered heat adjusting unit so as to decrease the amount of heat recovered of exhaust gas by the exhaust heat recoverer when a previous traveling time as the traveling history is equal to or shorter than a predetermined reference time.
3. The exhaust heat recovery control device according to claim 1, wherein the exhaust heat recoverer raises a temperature of a coolant for cooling an engine using the recovered heat of exhaust gas,
   wherein the recovered heat adjusting unit includes a circulation unit configured to circulate the coolant, and
   wherein the control unit adjusts the amount of heat recovered of exhaust gas by adjusting an amount of coolant circulated by the circulation unit.
4. The exhaust heat recovery control device according to claim 1, wherein the recovered heat adjusting unit adjusts the amount of heat recovered by adjusting a flow rate of exhaust gas passing through the exhaust heat recoverer.
5. The exhaust heat recovery control device according to claim 1, wherein the past traveling history is based on a previous traveling state of the vehicle prior to a present traveling state of the vehicle in which the control unit is controlling the recovered heat adjusting unit.
6. An exhaust heat recovery control device comprising:
   an actuator that adjusts an amount of heat recovered of exhaust gas by an exhaust heat recoverer that recovers heat of exhaust gas; and
   circuitry configured to determine whether freezing of a liquid in an exhaust pipe occurs based on a past traveling history of a vehicle and to control the actuator, on which the exhaust heat recovery control device is mounted, when the freezing in the exhaust pipe is predicted to occur.

* * * * *